United States Patent
Saito et al.

[11] Patent Number: 6,054,109
[45] Date of Patent: Apr. 25, 2000

[54] METHOD OF PURIFYING AQUEOUS SOLUTION OF HYDROGEN PEROXIDE

[75] Inventors: Noriyuki Saito; Mineo Izumi, both of Yokohama, Japan

[73] Assignee: Mitsubishi Chemical Corporation, Tokyo, Japan

[21] Appl. No.: 09/179,176

[22] Filed: Oct. 27, 1998

[51] Int. Cl.[7] .................................................. C01B 15/01
[52] U.S. Cl. ............................................................... 423/584
[58] Field of Search .................................................. 423/584

[56] References Cited

U.S. PATENT DOCUMENTS

| | | | |
|---|---|---|---|
| 4,999,179 | 3/1991 | Sugihara et al. | 423/584 |
| 5,232,680 | 8/1993 | Honig et al. | 423/584 |
| 5,851,505 | 12/1998 | Nishide et al. | 423/584 |

*Primary Examiner*—Wayne Langel
*Attorney, Agent, or Firm*—Oblon, Spivak, McClelland, Maier & Neustadt, P.C.

[57] ABSTRACT

A method of purifying an aqueous solution of hydrogen peroxide by using an ion exchange resin and a adsorbent to obtain a highly pure aqueous solution of hydrogen peroxide with a metal concentration of not more than 0.1 ppb and a total organic carbon concentration of not more than 10 ppm, which comprises, in the order of purificatory passage of the solution, (A) a step of removing dissociable impurities by means of a mixed bed ion exchange resin, (B) a step of removing undissociable impurities by means of a hydrophilic porous adsorbent having a specific surface of not less than 1000 $m^2/g$, and (C) a step of removing dissociable impurities by means of a mixed bed ion exchange resin.

10 Claims, 1 Drawing Sheet

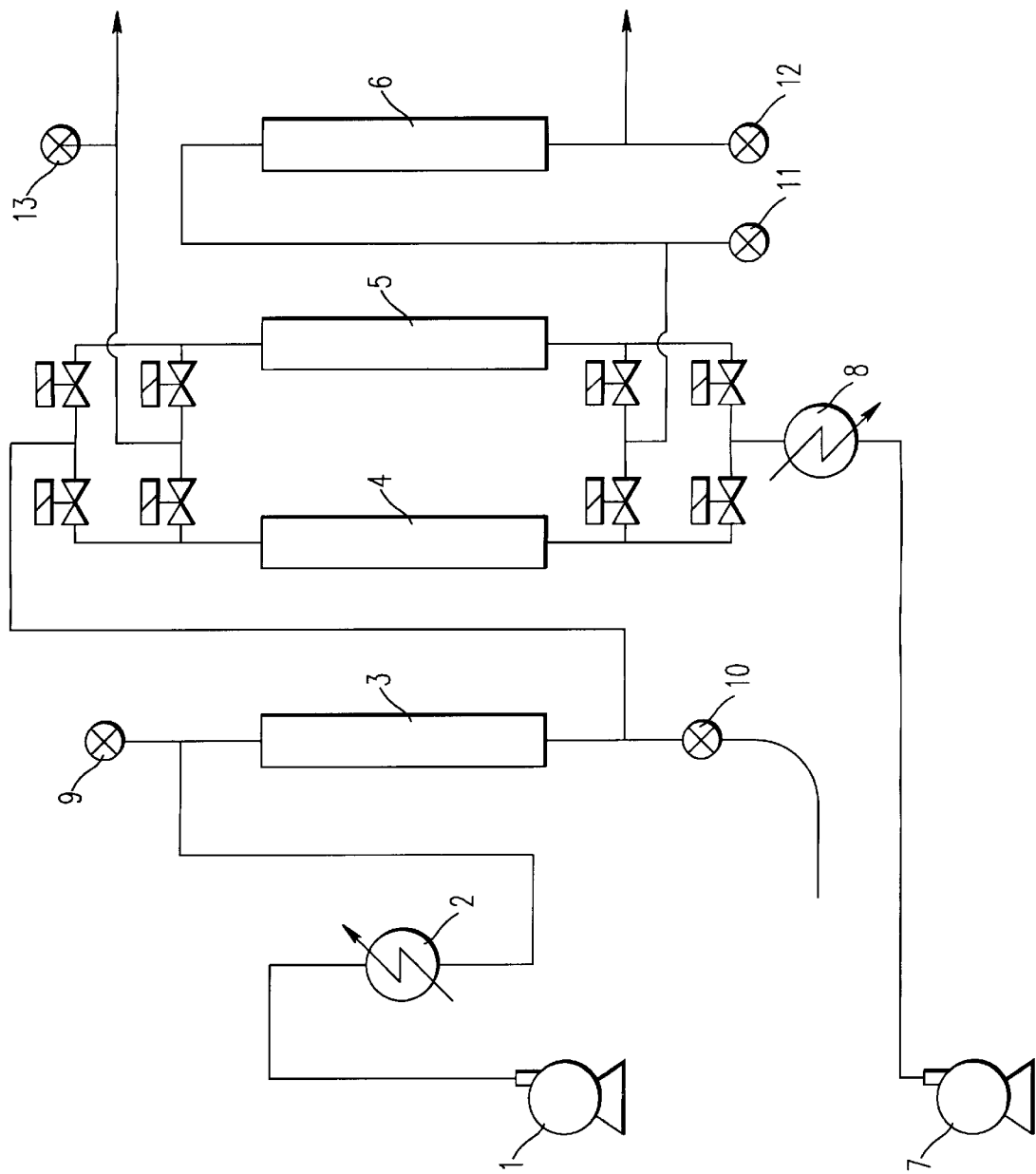

METHOD OF PURIFYING AQUEOUS SOLUTION OF HYDROGEN PEROXIDE

BACKGROUND OF THE INVENTION

1. Field of the Invention

The present invention relates to a method of purifying an aqueous solution of hydrogen peroxide, particularly to an adsorbent for production of a highly pure aqueous solution of hydrogen peroxide used for washing in the electronic industry and a purification method using the adsorbent.

2. Description of the Prior Art

As integrated circuits are densified, higher purity is demanded for washing solutions to be used in the electronic industry. Among them, an aqueous solution of hydrogen peroxide is used as an important washing solution and is required to have such a quality as a metal impurity concentration of at most 0.1 ppb and a total organic carbon (TOC) concentration of at most 10 ppm.

At present, aqueous solutions of hydrogen peroxide on the market are usually produced by the autoxidation method (the anthraquinone method). Aqueous solutions of hydrogen peroxide produced by this method are not suitable as the above-mentioned washing solutions for use in the electronic industry. To remove impurities in aqueous solutions of hydrogen peroxide, various methods have been proposed.

As a method of purifying an aqueous solution of hydrogen peroxide to high purity, a method has been proposed which comprises removing soluble impurities by passing a crude aqueous solution of hydrogen peroxide through a packed fixed or fluidized bed of a cation exchange resin for removal of cationic impurities, an anion exchange resin for removal of anionic impurities and an adsorbent (such as a synthetic adsorbent or activated carbon) for removal of organic carbon impurities and further removing insoluble impurities through a fine filter (U.S. Pat. No. 4,999,179, and WO92/06918).

Among the organic carbon impurities, dissociable components such as organic acids can be removed mostly by an ion exchange resin, while undissociable organic carbon impurities are removed primarily by various types of adsorbents. However, among impurities contained in an aqueous solution of hydrogen peroxide produced by the autoxidation method, especially the organic carbon impurities include a great variety of components ranging widely from readily adsorbable substances to hardly adsorbable substances in terms of adsorption to an adsorbent. Therefore, when a crude aqueous solution of hydrogen peroxide is passed through an adsorbent, hardly adsorbable organic carbon impurities compete with readily adsorbable organic carbon impurities for adsorption, whereby adsorption of the hardly adsorbable organic carbon impurities will be hindered. Thus, there used to be a problem that the adsorption capacity tends to be too small to produce the desired highly pure aqueous solution.

Therefore, if an adsorbent is used to remove undissociable organic carbon impurities in order to treat the same amount of a crude aqueous solution of hydrogen peroxide as an ion exchange resin can treat to remove dissociable impurities, frequent renewal of the adsorbent or a large amount of the adsorbent is necessary. However, use of a large amount of an adsorbent results in increase in the retention time of an aqueous solution of hydrogen peroxide in an adsorbent device, and when an organic adsorbent is used as the adsorbent, another problem of contamination due to elution of organic impurities from the adsorbent itself arises, whereby the desired highly pure aqueous solution of hydrogen peroxide can not be obtained. On the other hand, when an inorganic adsorbent is used as the adsorbent, hydrogen peroxide decomposes generating oxygen gas appreciably, whereby there is a drawback that stable operation is difficult.

SUMMARY OF THE INVENTION

The object of the present invention is to provide a method of safely producing a highly pure aqueous solution of hydrogen peroxide of constant quality with a metal concentration of at most 0.1 ppb and a total organic carbon concentration of at most 10 ppm by using an adsorbent and an ion exchange resin in appropriate combination.

The present inventors have conducted extensive research to solve the above-mentioned problems and, as a result, found that it is possible to safely and stably produce a highly pure aqueous solution of hydrogen peroxide with a metal concentration of not more than 0.1 ppb and a total organic carbon concentration of not more than 100 ppm by successively and efficiently removing dissociable and undissociable impurities in a raw aqueous solution of hydrogen peroxide by using a specific adsorbent and a column ion exchange and adsorption method in which a mixed bed ion exchange resin device containing a mixture of a cation exchange resin and an anion exchange resin, an adsorbent device packed with the specific adsorbent following the mixed bed ion exchange resin device for the preceding step, and another mixed bed ion exchange device similar to that for the preceding step as the mixed bed ion exchange resin device for the subsequent step are connected in series. The present invention has been accomplished on the basis of the discovery.

Namely, the present invention provides a method of purifying an aqueous solution of hydrogen peroxide by using an ion exchange resin and an adsorbent to obtain a highly pure aqueous solution of hydrogen peroxide with a metal concentration of not more than 0.1 ppb and a total organic carbon concentration of not more than 10 ppm, which comprises, in the order of purificatory passage of the solution, (A) a step of removing dissociable impurities by means of a mixed bed ion exchange resin device, (B) a step of removing undissociable impurities by means of an adsorbent device and (C) a step of removing dissociable impurities by means of a mixed bed ion exchange resin device.

The present invention also provides a method of producing a purified aqueous solution of hydrogen peroxide which comprises a step of contacting an aqueous solution of hydrogen peroxide containing organic impurities with a hydrophilic porous resin having a specific surface area of not less than 800 m$^2$/g to remove the organic impurities in the aqueous solution of hydrogen peroxide, and a method of purifying an aqueous solution of hydrogen peroxide which comprises contacting an aqueous solution of hydrogen peroxide with a hydrophilic porous synthetic adsorbent made of a styrene-divinylbenzene copolymer having a specific surface area of not less than 1,000 m$^2$/g.

BRIEF DESCRIPTION OF THE DRAWING

FIG. 1 is a flow diagram of an embodiment of a facility for carrying out the method of the present invention.

MODE FOR CARRYING OUT THE INVENTION

Now, the present invention will be described in detail.

The aqueous solution of hydrogen peroxide to be used as the raw material is not particularly limited. For example, usual commercial aqueous solutions of hydrogen peroxide complying with Japanese Industrial Standard or Food Additives Standard may be used. The concentration of the aqueous solution of hydrogen peroxide is not limited, either. For example, usually 5 to 60 wt % solutions, practically 10 to 35 wt % solutions are used as the raw material.

A usual commercial aqueous solution of hydrogen peroxide (hereinafter referred to as "a raw aqueous solution of hydrogen peroxide") contains metal impurities and organic carbon impurities attributable to the production method and impurities attributable to various stabilizers added for stabilization (prevention of decomposition) of the aqueous solution of hydrogen peroxide. The concentrations and the constituents of these impurities vary depending on the manufacturers. Nevertheless, the application of the present invention is not thereby restricted.

As the cation exchange resin packed in the mixed bed ion exchange resin device used in the present invention for removal of cationic impurities, a strongly acidic cation exchange resin made of a styrene-divinylbenzene (DVB) copolymer having sulfonic groups (—SO3H) as the exchange groups is usually used, and a resin of a gel type, a porous type or a high-porous type, may be used. Especially, the porous type is preferable. Further, it is preferred that the strongly acidic cation exchange resin is used in the hydrogen form in order to obtain a highly pure aqueous solution of hydrogen peroxide free form metal ions. In this case, the content of the ions on the exchange groups of the cation exchange resin is usually not less than 99 eq %, preferably not less than 99.9 eq % of the total exchange capacity.

On the other hand, the anion exchange resin for removal of anionic impurities is usually a strongly basic anion exchange resin made of a styrene-divinylbenzene copolymer and having quaternary ammonium groups as the exchange groups, and a resin of a gel type, a porous type or a high-porous type may be used. Especially, the porous type is preferable. Further, it is preferred that the strongly basic anion exchange resin is used in the bicarbonate form or in the carbonate form, in view of ion exchange capacity and in order not to leave traces on silicon wafers, etc. which are washed by an aqueous solution of hydrogen peroxide for use in the electronic industry. The content of the bicarbonate ion or the carbonate ion on the exchange groups of the anion exchange resin is usually not less than 99 eq %, preferably not less than 99.9 eq % of the total exchange capacity.

As the adsorbent for removal of undissociable organic impurities, an organic or inorganic adsorbent may be used. Especially preferred from the practical viewpoint is a porous resin which is usually made of a styrene-divinylbenzene copolymer having no ion exchange ability and which is an organic adsorbent inert to an aqueous solution of hydrogen peroxide.

The conditions for purificatory passage of the solution are preferably such that at the outlet of the mixed bed ion exchange resin device in the last step, the pressure is 0.5 to 10 kg/cm$^2$G, preferably 2 to 6 kg/CM$^2$G, and the temperature is 0 to 35° C., preferably 0 to 10° C. If the pressure is too low during the purificatory passage of the solution, the bicarbonate or carbonate ion exchanged by the anion exchange resin is liberated in the device as carbon dioxide gas, whereby stable purification of an aqueous solution of hydrogen peroxide is difficult. On the other hand, if the purification temperature is too high, oxygen gas is generated appreciably due to promotion of catalytic decomposition of an aqueous solution of hydrogen peroxide by the anion exchange resin, whereby safe purification of an aqueous solution of hydrogen peroxide is difficult. Thus, the above-mentioned operation conditions are preferable.

The method of purifying an aqueous solution of hydrogen peroxide is characterized in that in a column ion exchange and adsorption method in which a mixed bed ion exchange resin device containing a mixture of the cation exchange resin and the anion exchange resin, an adsorbent device packed with the adsorbent following the mixed bed ion exchange resin device for the preceding step, and another mixed bed ion exchange device similar to that for the preceding step as the mixed bed ion exchange resin device for the subsequent step, are connected in series, at least two adsorbent devices are provided so that a purification (adsorption) step and a regeneration (desorption) step are alternately repeated to successively and efficiently remove dissociable and undissociable impurities from the raw aqueous solution of hydrogen peroxide. In the above-mentioned purification process, the mixed bed ion exchange resin device for the preceding step is arranged in front of the adsorbent device for the purpose of removing not only metal ions constituting dissociable impurities but also dissociable organic carbon impurities such as organic acids (e.g. formic acid and acetic acid) in the raw aqueous solution of hydrogen peroxide before these impurities come into contact with the adsorbent. Suppression of competition between dissociable organic impurities and undissociable organic impurities for adsorption by the adsorbent in the adsorbent device can decrease substances which compete with hardly adsorbable substances in the undissociable organic impurities in the adsorbent device and thereby can lessen the load on the adsorbent.

Namely, the dissociable organic impurities (such as organic acids) have their own dissociation constants (Ka) and are equilibrated in an aqueous solution of hydrogen peroxide. These organic acids generally have small dissociation constants and most of them are present as molecules (when pKa=−log Ka, pKa=3.55 for formic acid, pKa=4.56 for acetic acid, at 25° C.). Therefore, if an aqueous solution of hydrogen peroxide containing these dissociable organic impurities is directly passed through an adsorbent having no ion exchange ability, dissociable organic impurities in the molecular state compete with undissociable organic impurities, which are not dissociable inherently, for adsorption, and prevent adsorption of hardly adsorbable undissociable organic impurities to be adsorbed by the adsorbent. Installation of a total carbon detector at the outlet of the adsorbent device may help judge whether to switch over the adsorbent devices, although the means of the judgement is not restricted to it. If the organic concentration of the raw aqueous solution of hydrogen peroxide is known, the judgement may be made on the basis of the flow volume.

As described above, it is possible to attain efficient removal of impurities by providing at least two adsorbent devices so that a purification (adsorption) step and a regeneration (desorption) step are repeated alternately. The regeneration (desorption) step is conducted as follows. Namely, when the total organic carbon concentration at the outlet of the adsorbent device engaged in the purification (adsorption) step reaches the target level of the concentration control, the flow of an aqueous solution of hydrogen peroxide is switched to the other adsorbent device (which is then engaged in the purification (adsorption) step). The adsorption device relieved of the purification (adsorption) step, is subjected to the regeneration (desorption) step comprising the following steps, by passing a regeneration fluid in the direction opposite to the previous flow of the purification (adsorption) step:

(a) a step of replacing the aqueous solution of hydrogen peroxide in the adsorbent device;

(b) a step of desorbing all the organic carbon adsorbed by the adsorbent at a temperature not lower than the adsorption temperature; and (c) a step of cooling the adsorbent device.

The organic carbon impurities in an aqueous solution of hydrogen peroxide range so widely from readily adsorbable substances to hardly adsorbable substances, as described above, and include such a great variety of components, that in the adsorbent device, readily adsorbable substances are adsorbed near the inlet of the adsorbent device, while hardly adsorbable substances, which show a long adsorption band, spread nearly to the outlet of the adsorbent device. Therefore, the regeneration fluid which flows in the direction opposite to the flow in the purification (adsorption) step enables regeneration (desorption) without spreading readily adsorbable substances nearly to the outlet of the adsorbent device. It is possible to provide a precolumn to adsorb highly adsorbable substances only and renew an inactivated precolumn after several repetitions of adsorption/regeneration, in case that the adsorbent near the inlet of the adsorbent device becomes inactive.

As the regeneration fluid used in the regeneration (desorption) step, deionized water having a total organic carbon concentration of not more than 1 ppm, preferably not more than 0.5 ppm, is used.

The operation temperatures in the regeneration (desorption) step are preferably as follows:

(d) in the step of replacing the aqueous solution of hydrogen peroxide in the adsorbent device, water at a temperature not higher than the room temperature is used;

(e) in the step of desorbing all the organic carbon adsorbed by the adsorbent, water at a temperature of 5 to 120° C., preferably warm water at a temperature not lower than 80° C., is used; and (f) in the step of cooling the adsorbent device, water at a temperature not higher than the room temperature is used.

The linear flow velocity of the regeneration fluid in the regeneration (desorption) step is 1.5 to 20 times as large as that of the aqueous solution of hydrogen peroxide in the purification (adsorption) step so that the regeneration (desorption) step takes 2 to 20 times less time than the purification (adsorption) step does. After the regeneration step, the adsorbent device is ready for use.

As the adsorbent used for the adsorbent device, a synthetic adsorbent or activated carbon may be used, although a synthetic adsorbent is preferable because its action is not accompanied by decomposition of an aqueous solution of hydrogen peroxide.

Such synthetic adsorbents include a porous synthetic adsorbent made of a styrene-divinylbenzene copolymer, or a porous synthetic adsorbent made of a styrene-divinylbenzene copolymer which is made partly hydrophilic.

Another mixed bed ion exchange device similar to that for the preceding step is arranged behind the adsorbent device to effectively remove a trace of dissociable impurities eluted from the adsorbent device with the aqueous solution of hydrogen peroxide.

WORKING EXAMPLES

Now, the present invention will be described in further detail with reference to Examples. However, it should be understood that the present invention by no means restricted to such specific Examples.

Example 1

FIG. 1 is a flow diagram of an embodiment of a facility for carrying out the method of the present invention. In the figure, numeral 1 denotes a feed pump for a raw aqueous solution of hydrogen peroxide, numeral 2 denotes a heat exchanger, numeral 3 denotes a mixed bed ion exchange resin device, numerals 4 and 5 denote adsorbent devices, numeral 6 denotes a mixed bed ion exchange resin device for the last step, numeral 7 denotes a feed pump for a regeneration fluid, numeral 8 denotes a heat exchanger for heating the regeneration fluid, and numeral 9 denotes a sampler for the aqueous solution of hydrogen peroxide flowing out of the heat exchanger 2. Numeral 10 denotes a sampler for the aqueous solution of hydrogen peroxide flowing out of the mixed bed ion exchange resin device 3. Numeral 11 denotes a sampler for the aqueous solution of hydrogen peroxide flowing out of the adsorbent device 4 or 5. Numeral 12 denotes a sampler for the aqueous solution of hydrogen peroxide flowing out of the mixed bed ion exchange resin device 6 for the last step. Numeral 13 denotes a sampler for the regeneration discharge flowing out of the adsorbent device 4 or 5 during regeneration of the adsorbent device 4 or 5.

A raw aqueous solution of hydrogen peroxide is fed into the heat exchanger 2 with the feed pump 1 and then passed through the mixed bed ion exchange resin device 3, the adsorbent device 4 or 5 and the mixed bed ion exchange resin device 6 for the last step successively. The inorganic ions and the dissociable organic substances in the raw aqueous solution of hydrogen peroxide are removed by ion exchange, and the dissociable organic substances are removed by adsorption.

As the raw aqueous solution of hydrogen peroxide, a 35 wt % commercial solution complying with JIS and Food Additives Standard (manufactured by Tokai Denka Kogyo K.K.) was used. The raw aqueous solution of hydrogen peroxide contained ten-odd ppm of sodium ion, ten-odd to a few hundreds ppb of other metals and several tenths to ten-add ppm of chloride ion, sulfate ion and phosphate ion. The total organic carbon concentration was 50 ppm.

As the mixed bed ion exchange resin devices 3 and 6, columns lined with a polytetrafluoroethylene (PTFE) with an inside diameter of 33 mm and a length of 1,300 mm which were packed with a mixture of 363 ml of a strongly acidic ion exchange resin, Diaion PK228® (manufactured by Mitsubishi Chemical Corporation) converted to the hydrogen form by ion exchange (not less than 99.9 eq %) and 737 ml of a strongly basic ion exchange resin, Diaion PA316® (manufactured by Mitsubishi Chemical Corporation) converted to the carbonate form by ion exchange (not less than 99.9 eq %), were used. The mixing ratio of the cation exchange resin to the anion exchange resin in the mixed resin beds was 1:1 in terms of ion exchange capacity.

As the adsorbent devices 4 and 5, columns with the same dimensions and made of the same material as the above mixed bed ion exchange resin devices which were packed with 1,100 ml of a synthetic adsorbent, WOFATIT EP63 (a porous synthetic adsorbent of a styrene-divinylbenzene copolymer type) (a hydrophilic resin having a specific surface area of not lower than 1,000 $m^2/g$, manufactured by Bayer; according to the manufacturer's catalogue), were used.

The raw aqueous solution of hydrogen peroxide was fed into the heat exchanger 2 at 0.9 l/hr with the feed pump 1 for the raw aqueous solution of hydrogen peroxide, adjusted to 5° C. and then passed downwards through the mixed bed ion exchange resin device 3, the adsorbent device 4 (while the adsorbent device 5 was kept standing by) and the mixed bed ion exchange resin device 6 successively.

The operation pressure at the outlet of the mixed bed ion exchange resin device 6 was maintained at 4 kg/cm$^2$G, and when the total organic carbon concentration of the aqueous solution of hydrogen peroxide at the outlet of the adsorbent device 4 became 8 to 9 ppm, the adsorbent device 4 was switched to the adsorbent device 5, which then continued the purification of the aqueous solution of hydrogen peroxide.

The adsorbent device 4 relieved of the purification (adsorption) step was regenerated under the following conditions with deionized water having a specific resistance of not less than 18 MΩ·cm and a total organic carbon concentration of not more than 0.5 ppm as the regeneration fluid fed into the heat exchanger 8 at a rate of 9 l/hr with the feed pump 7 for the regeneration fluid:

(h) 5.5 l of deionized water at ordinary temperature was passed upwards through the adsorbent device 4 from the bottom of the adsorbent device 4 to replace the aqueous solution of hydrogen peroxide in the column;

(i) then, the heat exchanger 8 was started up, and 100 l of deionized water adjusted to 80 to 95° C. was passed upwards from the bottom of the adsorbent device 4 to regenerate the adsorbent, while the flow pressure was maintained at 1.5 kg/cm$^2$G during the regeneration; and (j) after the regeneration by the heated deionized water, 5.5 l of deionized water at ordinary temperature was passed again to cool the adsorbent device 4 nearly to ordinary temperature, and the adsorbent device 4 was kept standing by for the next use in the purification (adsorption) step.

Then, when the total organic carbon concentration of the aqueous solution of hydrogen peroxide at the outlet of the adsorbent device 5 became 8 to 9 ppm, the adsorbent device 5 was switched to the adsorbent device 4, which then continued the purification of the aqueous solution of hydrogen peroxide. The above-mentioned steps were repeated 4 times until the mixed bed ion exchange resin device 3 underwent cracking (leakage of ionic components). The flow volume of the raw aqueous solution of hydrogen peroxide during the purification (adsorption) step by the adsorbent devices 4 and 5 was 130 l.

Part of the aqueous solution of hydrogen peroxide flowing out of the mixed bed ion exchange resin device 6 was withdrawn with the sampler 12 and analyzed with respect to the metals, chloride ion, sulfate ion, phosphate ion and all the organic carbon contained in it. The metal concentration was not more than 0.1 ppb for each element such as aluminum, iron, chromium, calcium and sodium, the concentrations of chlorine ion, sulfate ion and phosphate ion were not more than 10 ppb, the total organic carbon concentration averaged 6 ppm until switches of adsorbent devices, which indicates quite high purity.

The metals were analyzed by flameless atomic absorption spectrometry and ICP-MS, the chlorine ion, sulfate ion and phosphate ion were analyzed by ion chromatography, and the total organic carbon concentration was measured with a total organic carbon detector.

Example 2

The same raw aqueous solution of hydrogen peroxide was passed under the same conditions by using the same adsorbent devices 4 and 5 as in Example 1 except that the arrangement of pipelines was changed so that the mixed bed ion exchange resin device 6, which was used for the last step in Example 1, turned into the mixed bed ion exchange resin device for the first step, and a new mixed bed ion exchange resin device having ion exchange ability was connected as the device for the last step.

In the purification (adsorption) step, the adsorbent devices 4 and 5 were switched when the flow volume of the raw aqueous solution of hydrogen peroxide reached 130 l, like Example 1.

The concentration of each metal in the aqueous solution of hydrogen peroxide flowing out of the mixed bed ion exchange resin device for the last step was not more than 0.1 ppm, and the concentrations of chloride ion, sulfate ion and phosphate ion were not more than 10 ppb. The total organic carbon concentration averaged 6 ppm until switches of adsorbent devices.

Comparative Example 1

The same raw aqueous solution of hydrogen peroxide was passed under the same conditions as in Example 1 except that the adsorbent devices 4 and 5 were installed in front of the mixed bed ion exchange resin device 3 for the first step. In the purification (adsorption) step, the adsorbent devices 4 and 5 were switched when the flow volume of the raw aqueous solution of hydrogen peroxide reached 130 l, like Example 1.

The concentration of each metal in the aqueous solution of hydrogen peroxide flowing out of the mixed bed ion exchange resin device for the last step was not more than 0.1 ppb, and the concentrations of chloride ion, sulfate ion and phosphate ion were not more than 10 ppb. However, the total organic carbon concentration averaged as high as 12 ppm until switches of adsorbent devices.

Comparative Example 2

The same raw aqueous solution of hydrogen peroxide was passed under the same conditions as in Example 1 except that the adsorbent devices 4 and 5 were installed behind the mixed bed ion exchange resin device 6 for the last step. In the purification (adsorption) step, the adsorbent devices 4 and 5 were switched when the flow volume of the raw aqueous solution of hydrogen peroxide reached 130 l, like Example 1.

The concentrations of metals in the aqueous solution of hydrogen peroxide flowing out of the mixed bed ion exchange resin device for the last step were as high as a few tenths to ten-odd ppb. Although the concentrations of sulfate ion and phosphate ion were not more than 10 ppb, the concentration of chloride ion was as high as a few tens ppb. The total organic carbon concentration averaged 8 ppm until switches of adsorbent devices.

Effects of the Invention

According to the present invention, use of a specific adsorbent and an appropriate combination and application of ion exchange resins and the specific adsorbent make it possible to easily and efficiently remove various dissociable impurities (mainly, metal components, anionic components and dissociable organic substances) and undissociable impurities (mainly, undissociable organic substance), which can not be removed efficiently by a mere combination of ion exchange resins and the specific adsorbent, from a raw aqueous solution of hydrogen peroxide, and to provide a method of safely and stably purifying a highly pure aqueous solution of hydrogen peroxide with a metal concentration of not more than 0.1 ppb and a total organic carbon concentration of not more than 10 ppm.

What is claimed is:

1. A method of purifying an aqueous solution of hydrogen peroxide for washing solutions used in the electronic industries by using an ion exchange resin and an adsorbent to obtain a highly pure aqueous solution of hydrogen peroxide with a metal concentration of not more than 0.1 ppb and a total organic carbon concentration of not more than 10 ppm, which comprises, in the order of purificatory passage of the solution:

(A) a step of removing dissociable impurities by means of a mixed bed ion exchange resin, (B) a step of removing undissociable impurities by means of a hydrophilic porous adsorbent having a specific surface of not less than 1,000 $m^2/g$, and (C) a step of removing dissociable impurities by means of a mixed bed ion exchange resin.

2. The method according to claim 1, wherein the conditions for the purificatory passage of the solution are such that at the outlet of the mixed bed ion exchange resin in the last step, the pressure is 0.5 to 10 $kg/cm^2G$, and the temperature is 0 to 35° C.

3. The method according to claim 1, wherein in the step (B) of removing undissociable impurities, at least two adsorbent are provided so that a purification step and a regeneration step are alternately repeated to remove organic carbon impurities in the aqueous solution of hydrogen peroxide.

4. The method according to claim 2, wherein the regeneration step comprises:

(a) a step of replacing the aqueous solution of hydrogen peroxide in the adsorbent with a regeneration fluid which flows in the direction opposite to the purification step wherein the organic carbon impurities are adsorbed by an adsorbent, (b) a step of desorbing the organic carbon impurities adsorbed by the adsorbent at a temperature not lower than the adsorption temperature, and (c) a step of cooling the adsorbent.

5. The method according to claim 3, wherein the regeneration fluid used in the regeneration step is water, and the regeneration operation temperature is 5 to 120° C.

6. The method according to claim 3, wherein the ratio of the linear flow velocity of the aqueous solution of hydrogen peroxide in the purification step to the linear flow velocity of the regeneration fluid in the regeneration step is 1:1.5 to 20.

7. The method according to claim 1, wherein a hydrogen type strongly acidic cation exchange resin is used as a cation exchange resin device in the mixed bed ion exchange resin.

8. The method according to claim 1, wherein a bicarbonate type strongly basic anion exchange resin is used as an anion exchange resin in the mixed bed ion exchange resin device.

9. The method according to claim 1, wherein the mixing ratio of the cation exchange resin to the anion exchange resin device in the mixed bed ion exchange resin is 1:0.8 to 2 in terms of ion exchange capacity.

10. The method according to claim 1, wherein the adsorbent is a porous synthetic adsorbent having a matrix of a styrene-divinylbenzene copolymer.

* * * * *